United States Patent [19]

Kirchoff et al.

[11] 3,972,545

[45] Aug. 3, 1976

[54] MULTI-LEVEL COOL GAS GENERATOR

[75] Inventors: George F. Kirchoff, Brigham City; Fred E. Schneiter, North Ogden, both of Utah

[73] Assignee: Thiokol Corporation, Newtown, Pa.

[22] Filed: Mar. 10, 1975

[21] Appl. No.: 557,204

[52] U.S. Cl. .............................. 280/735; 102/37.7; 102/40; 180/103 A; 280/736; 280/741
[51] Int. Cl.² ........................................ B60R 21/08
[58] Field of Search ............ 102/40, 37.7; 180/103; 280/734, 735, 736, 741, 742

[56] References Cited
UNITED STATES PATENTS

| | | | |
|---|---|---|---|
| 3,532,358 | 10/1970 | Selwa | 280/150 AB |
| 3,649,045 | 3/1972 | Smith | 280/150 AB |
| 3,711,115 | 1/1973 | Lohr | 280/150 AB |
| 3,713,667 | 1/1973 | Blanchards | 280/150 AB |
| 3,758,131 | 9/1973 | Stephenson | 280/150 AB |
| 3,773,351 | 11/1973 | Cantanzarite | 280/150 AB |
| 3,773,353 | 11/1973 | Trowbridge | 280/150 AB |
| 3,785,674 | 1/1974 | Poole | 280/150 AB |
| 3,787,074 | 1/1974 | Lewis | 280/150 AB |
| 3,836,167 | 9/1974 | Wilson | 280/150 AB |
| 3,871,684 | 3/1975 | Staudacher | 280/150 AB |

Primary Examiner—M. H. Wood, Jr.
Assistant Examiner—John P. Silverstrim
Attorney, Agent, or Firm—Stanley A. Marcus; Edward E. McCullough

[57] ABSTRACT

A gas generator for inflating safety cushions in automotive vehicles has a tubular housing, closed at both ends except for a discharge orifice in one end. A hermetically sealed container in the completely closed end of the housing is divided by a consumable partition into two chambers containing gas generant material. Each of the two chambers is also equipped with an ignition means for igniting the gas generant. The remainder of the tubular housing is filled with the following elements, arranged in tandem series from the sealed container to the orifice of the housing: a filtering means, a first perforated plate, pH neutralizing material, a second perforated plate, cooling means, and a third perforated plate. An impact sensor, which is not a part of the present invention, determines whether one or both of the ignition means are fired on impact, depending upon the force of a collision; and, hence, the rate at which an inflatable structure is filled with gas.

7 Claims, 1 Drawing Figure

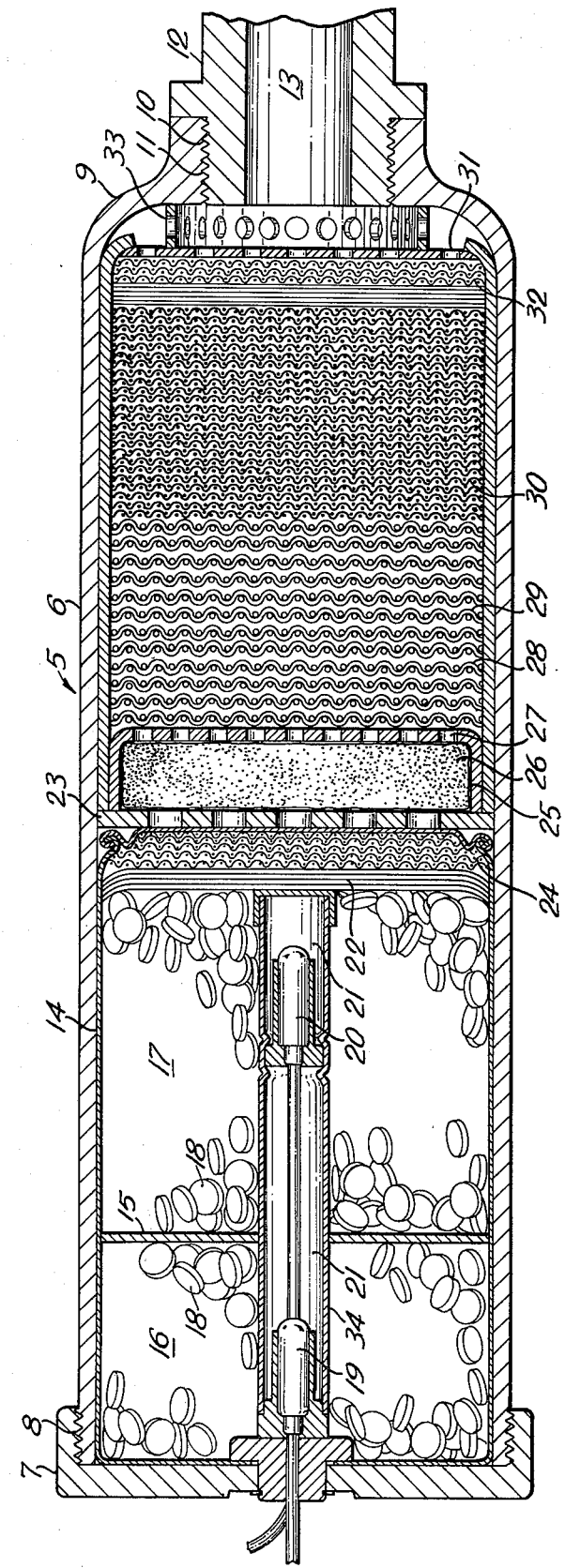

MULTI-LEVEL COOL GAS GENERATOR

CROSS-REFERENCES TO RELATED APPLICATIONS

This invention is related to U.S. Pat. application Ser. No. 417,349 "Gas Generator" by F. Schneiter, et al., filed Nov. 19, 1973.

BACKGROUND OF THE INVENTION

This invention relates to gas generators suitable for filling inflatable structures in the presence of humans. It has specific application to passive restraint cushions designed to provide impact protection to occupants of automotive vehicles.

The various degrees of violence experienced in automobile collisions make it impractical for a safety cushion to respond to all such situations with a fixed inflation level. An example of the extremes encountered would be the case of a large man in a high "g" impact and that of a child standing adjacent to the bag in a low level crash. A safety cushion forceful and fast enough to provide the support necessary to protect the large man in the high "g" impact deploys with such velocity that it would constitute serious risk of injury caused by rebound or rearward acceleration to the standing child in the low speed impact.

Attempts to solve this problem have been made in some current passive restraint systems by using a two level, pyrotechnic augmented, compressed gas bottle and a two level sensor. The sensor responds to the severity of impact by sending appropriate signals to fire one or both pyrotechnic charges. The burning pyrotechnics add heat to the stored gas and reduce the requirement for the quantity of gas that must be stored. The quantity of pyrotechnics being burned simultaneously determines the gas temperature and volume and resultant bag inflation level. An explosive charge ruptures a diaphragm at the orifice of the bottle.

This system, however, has been found to be unsatisfactory for a number of reasons: (1) The presence of an explosive charge at the orifice of the gas bottle and pyrotechnic charges inside the bottle of high-pressure gas makes this system somewhat hazardous to handle, ship, and store; (2) The system tends to be somewhat complex and bulky; and (3) The volume of gas and speed of its delivery to an inflatable structure is somewhat influenced by the initial temperature of the gas bottle — if it is initially very cold, the rate of inflation tends to be slowed.

A second two-stage system is shown and described in U.S. Pat. No. 3,663,035 to T. W. Norton, titled "Self-Contained Passenger Restraining System" (FIGS. 7 and 8). In this system, the main gas generating material is black powder; and, to avoid inflating the cushion with explosive force, the gas generant material is divided into two stages — one of which is delayed slightly by a time-delay fuse. This system is not intended to be responsive to variations in violence of impact on collision of the vehicle with another object; it is simply a means of using materials that are almost explosive to inflate a safety cushion.

SUMMARY OF THE INVENTION

The present invention has been developed to satisfy the need for a practical, reliable, gas-generating system for inflating safety cushions in automotive vehicles, that will automatically respond to a signal and adjust the rate of inflation so that it is commensurate with the severity of impact. It is essentially a gas generator having a tubular housing, closed at both ends except for a discharge orifice in one end thereof. A hermetically sealed container in the completely closed end of the housing is divided into two parts by a consumable partition and each chamber contains gas generant material and an ignition means therefor. The remainder of the housing is filled, sequentially from the container to the orifice, with a filtering means, a first perforated plate, pH neutralizing material, a second perforated plate, a cooling means, spacing means, and a third perforated plate.

A sensing means, not a part of the present invention, delivers an electrical signal to the ignition means, which is preferably two electric squibs. If the shock is severe, they will be fired simultaneously by a high-level signal, i.e., a signal above some designated threshold of voltage and/or current, to fill an inflatable structure with the utmost rapidity to insure safety of the vehicle's occupants. If the shock is less severe, only the squib nearest the discharge orifice will be fired by a low-level signal from the sensor. In the latter case, the second squib and gas generant are ignited by heat of combustion from the first, and combustion must proceed away from the orifice through the gas generant material to release gas more slowly.

The prior invention described in the related application cited above (Ser. No. 417,349) has components similar to those of the present invention (e.g., igniter, gas generant, filtering and cooling means, and housing). However, its components were annular and concentric about the igniter, and it lacked the dual igniters and gas generants separated by the consumable partition of the present invention, and it could not deliver gases to an inflatable structure with different levels of force. Hence, the present invention is considered to be an improvement thereover.

BRIEF DESCRIPTION OF THE DRAWING

In the drawings:

The FIGURE is a longitudinal section of the invention.

DESCRIPTION OF THE PREFERRED EMBODIMENTS

The gas generator 5 of the present invention has a tubular housing 6, closed at one end by an end cap 7 fastened by screw threads 8. The opposite end has an integral end cap 9 having an opening 10 equipped with screw threads 11 to receive an adapter 12 that is a part of an inflatable structure not shown. The adapter 12 contains the discharge orifice 13. A hermetically sealed container 14 is located adjacent the end cap 7 and contains a consumable partition 15 that divides it into two chambers 16 and 17. The partition 15 is preferably made of polystyrene, but could be made of many other consumable materials. These two chambers are filled with identical gas generant material 18 that may be any of a number of compositions having the required properties relating to toxicity, heat of combustion, and rate of combustion. However, in this preferred embodiment, the composition comprises a mixture by weight of 55% sodium azide ($NaN_3$), and 45% anhydrous chromic chloride ($CrCl_3$) in the form of pellets. Each chamber 16 and 17 is further equipped with an electric squib 19 and 20, respectively, surrounded by a pyrotechnic material 21. This material 21 may also be any one of a number of compositions; but, in our preferred embodiment, comprises a granular mixture of 25% by weight of boron and 75% of potassium nitrate.

The container 14 is preferably made of aluminum, about 5 mils thick; and is manufactured and sealed by the same process used for forming and sealing beverage cans.

A plurality of layers of filtering screens 22, comprising relatively fine wire screen (about 30 to 60 mesh) is adjacent the end of the container 14 and is retained in place by a first perforated plate 23 having the same diameter as the inside of the housing 6. A spacing means consisting of a plurality of layers of coarse screen 24 (about 8 to 16 mesh) separates the filtering screens 22 from the perforated plate 23 to provide a free-flow volume of space for gases that may emerge from the container 14 when the gas generant material 18 is fired. A plastic-film bag 25, containing a pH neutralizing material 26 is retained in a position adjacent the first perforated plate 23 by a second perforated plate 27. A preferred pH neutralizing material 26 is powdered iron sulfate, $Fe_2(SO_4)_3$ or $FeSO_4$. A cooling means 28 is made in two sections, the first section 29 comprises a plurality of layers of coarse wire screen similar to the spacing means 24, and the second section 30 comprising a plurality of layers of fine wire screen similar to the filtering screens 22. The second section 30 of the cooling means 28 is spaced from a third perforated plate 31 by a plurality of layers of coarse wire screen 32 similar to the spacing means 24. The third perforated plate 31 is in turn spaced from the main opening 10 of the housing 6 by a perforated annulus 33.

When the vehicle, in which the present invention is installed, collides with some other object, sensing devices, not a part of the present invention, deliver an electric signal. This signal or signals will then cause one or both electric squibs 19 and 20 to be fired. If the impact is severe, both squibs will be fired simultaneously for maximum effectiveness in delivering gases to the inflatable structure with maximum speed. However, if the impact is less severe, only the downstream squib 20 will be fired. In the latter case, combustion will proceed upstream through the partition 15 to ignite the squib 19 and the gas generant 18 in the upstream chamber 16. This provides a slower rate of inflation to provide a softer cushioning effect, but with the same quantity of gas.

It will be noted that the pyrotechnic material 21 that is contiguous with the upstream squib 19 extends well into the downstream gas generant chamber 17 via the tube 34 that holds both squibs 19 and 20 and the associated pyrotechnic materials 21. This tube 34 is made of very thin (about 5 mils) aluminum. Hence, in the event that a collision is of the low level type, wherein only the downstream squib 20 is ignited by an electric signal, the heat from the burning gas generant 18 in the downstream chamber 17 will be rapidly transmitted through the wall of the tube 34 to ignite the pyrotechnic material 21 that is associated with the upstream squib 19. The squib 19 and its pyrotechnic material 21 will then rupture the wall of the tube 34 to ignite the gas generant material 18 in the upstream chamber 16. This causes a somewhat slower delivery of gases to an inflatable structure than in the case of a high-level impact wherein both squibs are fired simultaneously.

The gases thus produced then pass through the fine filtering screens 22, into a plenum chamber created by the plurality of layers of coarse screens 24, that act as spacers to space the filter 22 away from the end of the container 14. When sufficient pressure is built up, the gases rupture the container 14 and pass through the perforations of the plate 23. They then enter the pH neutralizing material 26, where the somewhat alkaline gases are neutralized, through the second perforated plate 27, the cooling screens 28, through the third perforated plate 31 and perforated annulus 33 into the discharge orifice 13.

An invention has been described that advances the art of safety devices for automotive vehicles. Although the preferred embodiment has been described specifically with regard to detail, it should be noted that many such details may be altered without departing from the scope of the invention, as it is defined in the following claims.

The invention claimed is:

1. In a gas generator for delivering gas to an inflatable structure in response to a sensor, said generator including a housing having an outlet orifice in communication with said inflatable structure, a gas generant material in said housing, and filtering and cooling means between said gas generant material and said orifice, the improvement comprising: a consumable partition dividing said gas generant material into first and second portions; a first electric-initiated igniter adjacent said first portion for igniting it in response to any signal from said sensor; a second electric-initiated igniter adjacent said second portion for igniting it in response to only a high-level signal from said sensor, said second igniter extending through said partition from said second portion into said first portion, whereby said second igniter may be ignited either simultaneously with said first igniter in response to said high-level signal, or sequentially, with respect to said first igniter, by the heat of combustion from said first portion.

2. The gas generator of claim 1 wherein each igniter comprises an electric squib and pyrotechnic material contiguous therewith.

3. The gas generator of claim 2 further including a thin-walled, easily rupturable tube, wherein the two igniters are contained, in tandem arrangement.

4. The gas generator of claim 1 wherein the housing is tubular and the gas generant, filtering means, and cooling means are arranged in tandem therein.

5. The gas generator of claim 1 further including a pH neutralizing material between the fitering means and the cooling means.

6. The gas generator of claim 1 wherein the filtering means and the cooling means are made of layers of wire screen.

7. The gas generator of claim 1 wherein the gas generant material and the ignition means are contained in an hermetically sealed, easily rupturable container.

* * * * *